United States Patent Office 3,014,066
Patented Dec. 19, 1961

3,014,066
PREPARATION OF ESTERS
Edwin Robert Kerr, Fishkill, N.Y., and Morford C. Throckmorton, Akron, Ohio, assignors to Texaco Inc., New York, N.Y., a corporation of Delaware
No Drawing. Filed Feb. 25, 1960, Ser. No. 10,876
9 Claims. (Cl. 260—497)

The subject invention relates to a process for preparing tertiary alkyl esters of carboxylic acids. More particularly, it relates to a process for reacting a tertiary base olefin, also called a tertiary olefin, with a carboxylic acid in a liquid phase reaction employing a solid catalyst.

In the commonly assigned copending application Serial No. 801,434 filed March 24, 1959 in the names of R. Y. Heisler, H. V. Hess, G. W. Eckert and M. C. Throckmorton, there is disclosed a process for preparing tertiary alkyl esters of carboxylic acids in a liquid phase reaction employing a solid catalyst broadly described as period III polyvalent metal silicates. Examples of such catalysts are silica-alumina and silica-magnesia cracking catalysts. Both synthetic and naturally occurring period III polyvalent metal silicate catalysts are effective in directing the reaction between carboxylic acids and tertiary olefins to form t-alkyl esters. The process of the present invention involves the discovery that an oxidation catalyst comprising vanadium oxide, alkali metal sulfate and silicate is also extremely effective in directing the reaction between tertiary olefins and carboxylic acids to produce high yields of the tertiary alkyl esters with minimum formation of olefin polymer.

The process of this invention for preparing tertiary esters of carboxylic acids comprises reacting a tertiary olefin with a carboxylic acid in the liquid phase at a temperature between about 100 and 300° F. in the presence of a solid catalyst comprising 5–20 weight percent vanadium pentoxide, 15–30 weight percent alkali metal sulfate and 50–80 weight percent silica. With a vanadium pentoxide-alkali metal sulfate-silica catalyst, the reaction between the tertiary olefin and the carboxylic acid is directed to form a tertiary alkyl ester to the substantial exclusion of the competing polymerization reaction.

The effective catalyst comprises 5–20 weight percent vanadium pentoxide, 15–30 weight percent alkali metal sulfate and 50–80 weight percent silica. The alkali metal sulfate component is usually potassium sulfate although both sodium and lithium sulfate are also employed. A preferred catalyst comprises 10 weight percent vanadium pentoxide, 23 weight percent potassium sulfate and 67 weight percent silica. The catalyst used in the process of the invention is a commerically available oxidation catalyst and is normally not considered as effective for esterification reactions.

A large number of other solid catalysts have been evaluated for the esterification reaction of tertiary olefins with carboxylic acids and they have been found to be distinctly inferior to the period III polyvalent metal silicate catalysts of the afore-identified copending application and to the vanadium pentoxide-alkali metal sulfate-silica catalyst of the instant invention. Other solid catalysts either have given extremely poor conversion of reactants to ester or have produced a large amount of by-product olefin polymer along with t-alkyl ester.

The following catalysts were evaluated in the formation of t-alkyl esters by the reaction of carboxylic acids with tertiary olefins and found to be definitely inferior to the vanadium pentoxide, alkali metal sulfate, silica catalysts of this invention: sodium acid sulfate, titania, titania-silica, chromia-alumina, silica-chromia alumina, titania-chromia-alumina, ferric oxide-silica, calcium oxide-silica, boria-alumina-aluminum fluoride, molybdena-zinc oxide-alumina, nickel tungsten oxide-alumina, aluminum oxide-aluminum acetate, aluminum chloride-alumina, vanadia-alumina, boria-alumina and nickel phosphate-calcium phosphate. Other catalysts such as hydrogen fluoride-treated silica alumina and a conventional polymerization catalyst such as o-phosphoric acid adsorbed on kieselguhr gave excessive polymerization of the tertiary olefin even though a substantial amount of ester product was obtained.

The vanadium pentoxide-alkali metal sulfate silica catalyst has a long catalyst life in the process of this invention for preparing tertiary alkyl esters. The catalyst is capable of operating on stream for as long as 600 hours and even longer without any appreciable loss in catalyst activity. When catalyst activity has declined it is simply regenerated by calcining it in the presence of air at a temperature of about 900° F. The oxidative regeneration step can be repeated numerous times without substantial impairment of catalyst activity. The important thing to be observed in regenerating or calcining the catalyst is to prevent its sintering at temperatures above about 1000° F.

The term "tertiary olefin" denotes a material in which at least one of the carbon atoms forming the olefinic bond is completely substituted with carbon atoms or, stated another way, at least one of the double-bonded carbon atoms is devoid of a hydrogen substituent. The most common tertiary olefins are those in the aliphatic series containing 4–18 carbon atoms. Examples of these tertiary olefins are isobutylene, 2-methyl-2-butene, 2-methyl-2-pentene, 2-methyl-1-butylene and 3-methyl-3-octene. Cycloaliphatic olefinic compounds such as 1-methyl-1-cyclohexene are also tertiary olefins and usable in the process of the invention for preparing tertiary alkyl esters. The olefins most commonly employed in the process of the invention because of cost and availability are isobutylene, 2-methyl-1-butene and 2-methyl-2-butene.

Tertiary olefins can be employed in a relatively pure condition or in admixture with one another, with other olefins or with paraffinic hydrocarbons. In the production of tertiary butyl esters of monocarboxylic acids which recently have become important commercial compounds because of their use as octane appreciators for leaded gasolines, there may be used pure isobutylene formed by cracking isobutylene dimer or so-called "B—B" stream from catalytic cracking which comprises approximately 10–25 mol percent isobutylene, 50 mol percent paraffins with the balance comprising butene-1 and cis- and trans-butene-2. When a "B—B" stream is employed, isobutylene selectively reacts with the monocarboxylic acid with the result that t-butyl esters are produced to the substantial exclusion of secondary esters.

The carboxylic acid reactant employed in the process of this invention is normally a hydrocarbyl monocarboxylic acid containing 1–20 carbon atoms and usually containing 1–12 carbon atoms. The process of the invention is also effective, however, with polybasic acids containing two or more carboxylic acid radicals and 2 to 12 or more carbon atoms. The carboxylic acid reactant can also contain substituents in place of the hydrogen atoms on the hydrocarbon skeleton for example, keto radicals, nitro radicals, halogen atoms, alkoxy radicals and sulfhydryl radicals can be present on the carbon skeleton of the monocarboxylic acid.

Effective carboxylic acids in the process of the invention for producing tertiary esters are exemplified by acetic acid, malonic acid, propionic acid, butyric acid, isobutyric acid, valeric acid, isovaleric acid, 2-ethylhexanoic acid, benzoic acid, caproic acid, formic acid, cyclohexanecarboxylic acid, sebacic acid, adipic acid and azelaic acid. The acids can be dissolved in inert vehicles such as selected hydrocarbon fractions, dialkyl ethers, aromatic solvents such as benzene and toluene. The use of solvents for dissolving the reactants is particularly useful in situations where the acid reactant is a solid.

The esterification process of the invention is normally effected with one of the reactants, usually the tertiary olefin, in excess. When forming t-alkyl esters of monocarboxylic acid it is advantageous to use mol ratios of olefin to acid between 1.2–5:1 and preferably between 2–4:1. Although an excess of olefin over acid is normally employed, the process of the invention also proceeds smoothly employing an excess of carboxylic acid reactant.

The esterification reaction of this invention is effected at a temperature between 100–300° F. and preferably at a temperature between about 125–250° F.

The esterification reaction is effected at a pressure sufficient to maintain liquid phase reaction conditions. Pressures between about 25 and 500 p.s.i.g. can be employed but the reaction is normally effected at pressures between 75 and 300 p.s.i.g.

Since the catalyst is solid, the reactants are advantageously pumped through a fixed bed of the catalyst in a continuous manner. Space velocities for the operation between 0.1 and 5 liquid volumes of feed per bulk volume of catalyst per hour are recommended with the preferred space velocity falling between 0.25 and 2 v./v./hr.

The preparation of tertiary alkyl esters by reaction of tertiary olefins with a monocarboxylic acid employing a vanadium pentoxide-potassium sulfate-silica catalyst is illustrated by the following runs.

Isobutylene and acetic acid in a mol ratio of 2 mols of isobutylene per mol of acetic acid were charged to a reaction vessel containing a catalyst comprising 10 weight percent vanadium pentoxide, 23 weight percent potassium sulfate and 67 weight percent silica. The reactants were charged to the reaction vessel at a space velocity of 0.5 volume of reactant feed per volume of catalyst per hour. While the pressure was maintained at about 250 p.s.i.g., the reaction temperature was varied between 125 and 200° F. in three different runs with the results shown in Table I.

In Table I the percent isobutylene conversion was determined by dividing the mols of isobutylene converted by the mols of isobutylene charged and multiplying by 100. The percent catalyst selectivity was determined by dividing the amount of isobutylene converted to tertiary butyl acetate by the amount of isobutylene converted and multiplying by 100. The percent tertiary butyl acetate yield was determined by dividing the mols of tertiary butyl acetate produced by the mols of acetic acid charged to the reactor and multiplying by 100.

Table I

| Temp., ° F. | Isobutylene Conversion, (Percent) | | Catalyst Selectivity, (Percent) | | t-Butyl Acetate Yield, Percent | |
|---|---|---|---|---|---|---|
| | 10 hrs. | 25 hrs. | 10 hrs. | 25 hrs. | 10 hrs. | 25 hrs. |
| 125 | 12 | 10 | 86 | 94 | 23 | 17 |
| 150 | 16 | 18 | 94 | 91 | 28 | 33 |
| 200 | 24 | 17 | 89 | 94 | 43 | 31 |

The data in the foregoing table show that the vanadium pentoxide-potassium sulfate-silica catalyst gives excellent control of the reaction between isobutylene and acetic acid to produce t-butyl acetate to the substantial exclusion of polymer and alcohol byproducts over the temperature range of 125–200° F. Over this temperature range the lowest catalyst selectivity obtained was 86% and this was at the lowest catalyst temperature of 125° F. It is significant that the catalyst selectivity generally appears to increase with onstream time as evidence by the fact that the selectivity at 25 hours was better than at 10 hours at both the 125 and 200° F. temperature level.

Although the invention has been illustrated with the use of a relatively pure tertiary olefin stream, the selectivity of the catalyst for mixtures containing tertiary olefins such as a "B—B" stream is of the same order of magnitude.

Obviously, many modifications and variations of the invention as hereinbefore set forth may be made without departing from the spirit and scope thereof and, therefore, only such limitations should be imposed as are indicated in the appended claims.

We claim:
1. In a process for reacting a tertiary olefinic compound with a carboxylic acid to form the corresponding ester, the improvement which comprises contacting said reactants in the liquid phase at a temperature between about 100 and 300° F. in the presence of a catalyst comprising 5–20 weight percent vanadium pentoxide, 15–30 weight percent alkali metal sulfate and 50–80 weight percent silica.

2. The improvement of claim 1 wherein a temperature between 125 and 250° F. is employed.

3. The improvement of claim 1 wherein a pressure between 25 and 500 p.s.i.g. is employed.

4. The improvement of claim 1 in which a catalyst comprising 10 weight percent vanadium pentoxide, 23 weight percent potassium sulfate and 67 weight percent silica is employed.

5. In a process for reacting a tertiary aliphatic olefin containing 4 to 18 carbon atoms with a hydrocarbyl monocarboxylic acid containing 1 to 20 carbon atoms to form a t-alkyl ester of said monocarboxylic acid, the improvement which comprises contacting said reactants in a mol ratio of tertiary olefin to acid between 1.2–5:1 in the liquid phase at a temperature between 100 and 300° F. in the presence of a catalyst comprising 5–20 weight percent vanadium pentoxide, 15–30 weight percent alkali sulfate and 50–80 weight percent silica.

6. The improvement of claim 5 in which a temperature between 125 and 250° F. is employed.

7. The improvement of claim 5 in which a pressure between 75 and 300 p.s.i.g. is employed.

8. The improvement of claim 5 wherein isobutylene and acetic acid are reacted in a mol ratio between 2–4:1 and at a temperature between 125 and 250° F.

9. The improvement of claim 5 in which a catalyst comprising 10 weight percent vanadium pentoxide, 23 weight percent potassium sulfate and 67 weight percent silica is employed.

No references cited.